United States Patent

Suzuki

[11] Patent Number: 4,468,928
[45] Date of Patent: Sep. 4, 1984

[54] ALTITUDE RESPONSIVE TURBOCHARGER CONTROL SYSTEM

[75] Inventor: Satoshi Suzuki, Katsuta, Japan
[73] Assignee: Hitachi, Ltd., Tokyo, Japan
[21] Appl. No.: 388,218
[22] Filed: Jun. 14, 1982
[30] Foreign Application Priority Data
Jun. 16, 1981 [JP] Japan .................... 56-92434
[51] Int. Cl.³ ............................ F02B 37/12
[52] U.S. Cl. .................................... 60/602
[58] Field of Search .............. 60/600, 601, 602, 603, 60/611; 123/564

[56] References Cited
U.S. PATENT DOCUMENTS

| | | | |
|---|---|---|---|
| 1,508,707 | 9/1924 | Moss | 123/564 |
| 2,374,708 | 5/1945 | Shoults | 60/602 X |
| 2,454,038 | 11/1948 | Crever | 60/602 X |
| 2,476,063 | 7/1949 | Ridgley et al. | 60/602 X |
| 3,035,408 | 5/1962 | Silver | 60/602 |

*Primary Examiner*—Michael Koczo
*Attorney, Agent, or Firm*—Antonelli, Terry & Wands

[57] ABSTRACT

A turbocharger control system has a waste gate operative to cause engine exhaust gases to bypass the turbocharger to protect the engine when the supercharging pressure exceeds a predetermined pressure level. A pressure modulator is provided to mix pressures derived from points upstream and downstream of a compressor to produce a controlling pressure which is modulated to be of a pressure level between the compressor-upstream and downstream pressures and which is also adjusted as a function of the atmospheric pressure. A waste gate actuator compares the supercharging pressure and the controlling pressure to control the operation of the waste gate. When a motor vehicle equipped with the system is operated at high altitude where the atmospheric pressure is lower than that obtained at a low altitude, the controlling pressure is adjusted to be substantially the same as the controlling pressure obtained at the low altitude, whereby the waste gate is opened only at a predetermined pressure level of the supercharging pressure to assure a good engine operability.

8 Claims, 5 Drawing Figures

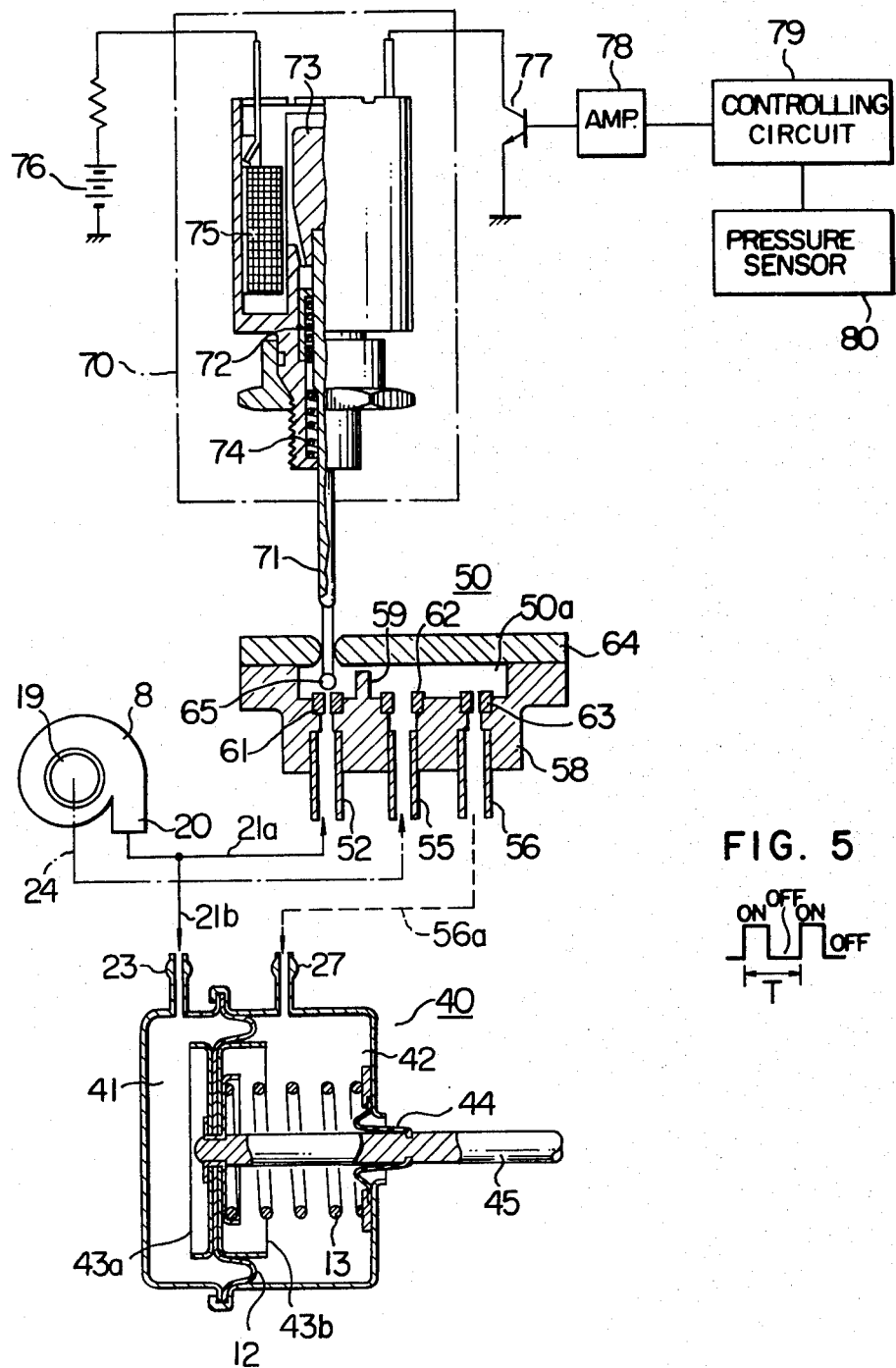

ALTITUDE RESPONSIVE TURBOCHARGER CONTROL SYSTEM

BACKGROUND OF THE INVENTION

1. Field of the Invention

The present invention relates to a control system for turbochargers for use with internal combustion engines of motor vehicles.

2. Description of the Prior Art

Nowadays, small-sized superchargers are installed even on popular passenger cars so as to improve the engine output torque during low and intermediate speed operations. However, because the engine would be damaged if the supercharging pressure rises to an unduly high level during a high speed engine operation, a part of the engine exhaust gases is caused to bypass the supercharger to keep the supercharging pressure within a predetermined level during high speed engine operations. For this purpose, the supercharger is provided with a controlling system including an exhaust gas bypass passage in which an exhaust gas bypass valve is provided. The supercharging pressure is utilized to control the operation of the bypass valve.

The pressure level of the supercharging pressure can be detected by electrical or mechanical system. The electrical system utilizes a pressure sensor operative to transduce detected pressures into an electrical signal. When the electrical signal rises beyond a predetermined level, an actuator is operated to drive the bypass valve to an open position. The mechanical system utilizes a diaphragm having opposite faces subjected to the supercharging pressure and to the atmospheric pressure, respectively. The diaphragm is operatively connected by a rod to the exhaust gas bypass valve. When the pressure differential between the supercharging and atmospheric pressures exceeds a predetermined value, the diaphragm is deformed to actuate the bypass valve to an open position. Compared with the electrical systems, the mechanical systems can be manufactured at a lower cost and provide more reliable operations. For this reason, the mechanical systems are in wide use on commercially available motor vehicles.

The mechanical systems, however, have a following problem: In order that engine exhaust gases may be released bypassing a turbocharger when the supercharging pressure exceeds, for example, 400 mmHg, the bypass valve may be opened when the pressure differential between the supercharging and atmospheric pressures respectively acting on the opposite faces of the diaphragm exceeds 400 mmHg. Assuming that a motor vehicle equipped with a turbocharger having a bypass valve actuated by such mechanical control system is operated in high altitudes, the atmospheric pressure is reduced by 9 mmHg as the altitude is increased by 100 meters. In other words, the atmospheric pressure is substantially 670 mmHg at 1,000 meters above sea level; therefore, the exhaust gas bypass valve is opened at a supercharging pressure of 310 mmHg, so that any further increase of supercharging pressure does not take place. As a result, the weight of the air supplied into the engine is reduced with a resultant decrease in the engine speed. As such, the engine performance is lowered at a high altitude than at a low altitude.

SUMMARY OF THE INVENTION

It is an object of the present invention to provide a turbocharger control system which is operative to assure a favorable engine performance even at a high altitude.

It is another object of the present invention to provide a turbocharger control system which is accurately operative to cause engine exhaust gases to bypass the turbocharger when the supercharging pressure exceeds a predetermined pressure level.

According to the present invention, air pressures derived respectively from points upstream and downstream of a compressor of a turbocharger are mixed and modulated into a controlling pressure which is of a pressure level between the compressor-upstream and downstream pressures and is adjusted in accordance with variation in the atmospheric pressure. The thus adjusting controlling pressure and the compressor-downstream pressure are compared to actuate an exhaust gas bypass valve.

The above and other objects, features and advantages of the present invention will be made more apparent by the following description with reference to the accompanying drawings.

BRIEF DESCRIPTION OF THE DRAWINGS

FIG. 4 is similar to FIG. 3 but illustrates another embodiment of the turbocharger control system according to the present invention.

FIG. 5 diagrammatically illustrates pulsated current supplied by an amplifier to a transistor shown in FIG. 4.

DESCRIPTION OF PREFERRED EMBODIMENTS

Figure 1:
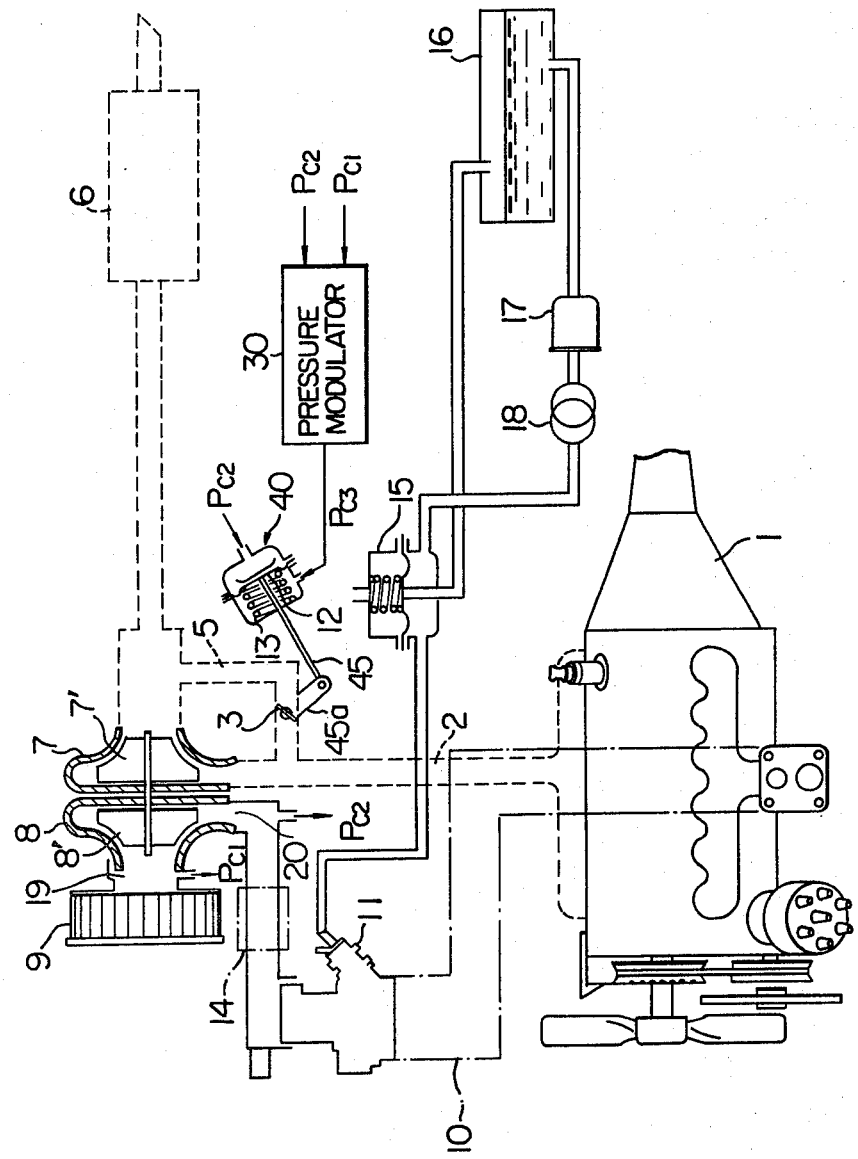
FIG. 1 is a diagrammatic illustration of a turbocharged internal combustion engine equipped with an embodiment of the turbocharger control system according to the present invention.

Referring now to the drawings wherein like reference numerals are used throughout the various views to designate like parts and, more particularly, to FIG. 1, according to this figure an internal combustion engine 1 is equipped with a turbocharger of the type that is provided with an exhaust gas bypass system. The engine exhaust gases are introduced through an exhaust manifold 2 into a turbine 7 to rotate a turbine impeller 7' mounted on a shaft which is common to an impeller 8' of a compressor 8. Thus, the rotation of the turbine impeller 7' is effective to drive the compressor 8 so that air sucked through an air cleaner 9 into the compressor 8 is compressed by the compressor impeller 8' and fed through an intake manifold 10 into the engine 1. A fuel is injected by a fuel injector 11 into the intake manifold 10 to form an air/fuel mixture. The injected amount of fuel is substantially proportioned to the weight of the air fed into the engine. Thus, the combustion of the air/fuel mixture in the engine produces an energy which is higher than in normal internal combustion engine. The turbocharger, therefore, is operative to increase the engine output torque.

The rotational speed of the impellers 7', 8' of the turbocharger is increased as a function of the amount of the engine exhaust gases which, in turn, is increased in proportion to the engine speed. Thus, there is a possibility that the engine would be damaged if the engine speed exceeds a predetermined speed. In order to eliminate this possibility, therefore, an exhaust gas bypass passage 5 is provided to directly connect the exhaust manifold 2 with an exhaust gas outlet of the turbine 7 and, in addition, an exhaust gas bypass valve or waste gate 3 is provided in the bypass passage 5 so that the valve 3 is opened to release the exhaust gases from the exhaust manifold 2 through the bypass passage 5 when the supercharging pressure exceeds a predetermined pressure level.

For this purpose, an actuator generally designated by the reference numeral 40 is provided for the exhaust gas bypass valve 3. The actuator 40 comprises a housing and a diaphragm 12 which divides the interior of the housing into two chambers into one of which a supercharging pressure $P_{c2}$ is introduced from a point downstream of the compressor 8. This supercharging pressure $P_{c2}$ is also introduced into a controlling pressure generating means or pressure modulator 30 together with another pressure $P_{c1}$ derived from a point upstream of the compressor 8. The pressure modulator 30 is operative to produce a controlling pressure $P_{c3}$ which is introduced into the other chamber in the actuator 40. When the supercharging pressure $P_{c2}$ becomes higher than the controlling pressure $P_{c3}$, the diaphragm 12 is deformed against a spring 13 in the actuator 40 so that a rod 45 having an end secured to the central area of the diaphragm 12 is driven to angularly move a valve lever 45a to thereby rotate the valve 3 to an open position. The engine exhaust gases from the turbine 7 and from the bypass passage 5 are discharged through a silencer 6 into the atmosphere.

The fuel is supplied under pressure to the fuel injector 11 from a tank 16 through a filter 17, a pump 18 and a pressure regulator 15 and is injected through and atomized by the injector 11 at a constant pressure higher than the supercharging pressure $P_{c2}$.

An intercooler 14 is provided around a supercharging air passage between the compressor 8 and the intake pipe 10 to cool the compressed supercharging air to thereby increase the supercharging effect.

Figure 2:
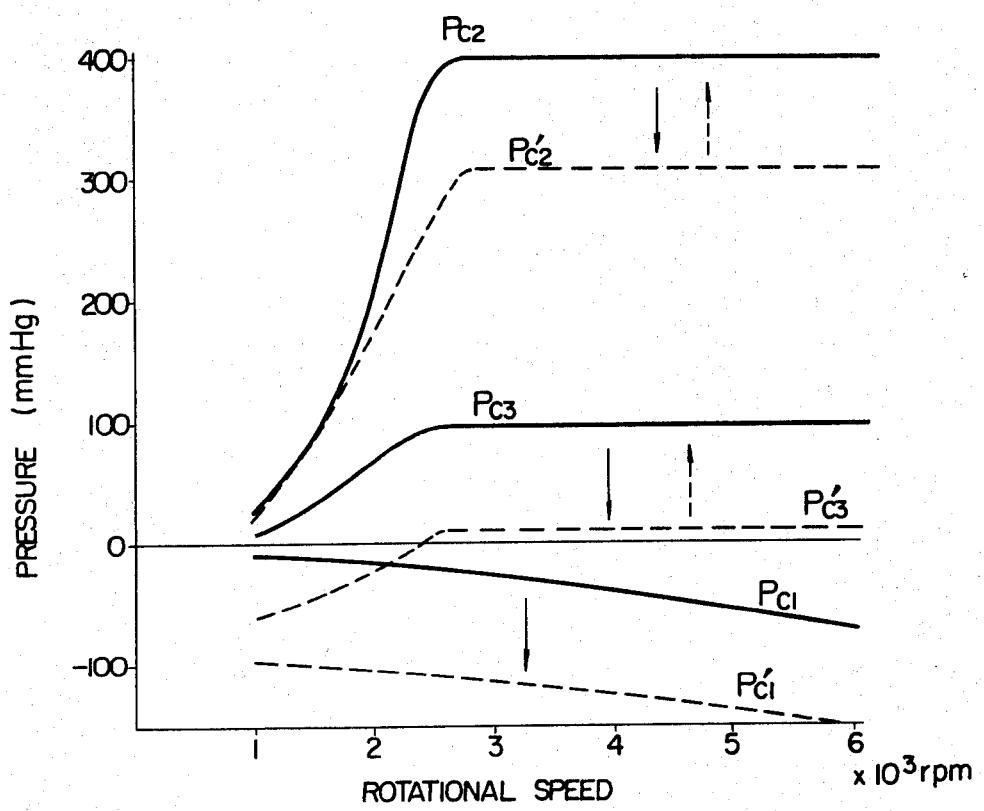
FIG. 2 graphically illustrates the operation of the turbocharger control system shown in FIG. 1.

In FIG. 2, the abscissa represents the rotational speed of the internal combustion engine 1 while the ordinate represents pressures $P_{c1}$, $P_{c2}$ and $P_{c3}$ which are indicated in terms of mmHg and are increased and decreased with respect to the atmospheric pressure shown as zero (0) mmHg. Solid line curves represent the pressures $P_{c1}$, $P_{c2}$ and $P_{c3}$ which can be obtained at a low altitude generally equal to or slightly higher than the sea level. It will be seen that the pressure $P_{c1}$ derived from the point upstream of the compressor 8 is negative pressure or vacuum which increases as the engine speed is increased. In the example shown, the compressor intake vacuum is about $-60$ mmHg when the engine speed is 6,000 rpm. The supercharging pressure $P_{c2}$ is increased up to about 400 mmHg when the engine speed is increased up to about 2,500 rpm. In other words, the turbocharger control system shown in FIG. 1 is arranged such that the bypass valve 3 is opened at engine speed of about 2,500 rpm and at supercharging pressure of about 400 mmHg. When the engine speed is raised to a level slightly lower than 2,500 rpm, the operation of the actuator 40 is started to repeatedly move the bypass valve 3 between open and closed positions and the supercharging pressure $P_{c2}$ gradually reaches its maximum pressure level. At engine speed higher than 2,500 rpm, the bypass valve 3 is completely opened to maintain the supercharging pressure at a substantially constant level of 400 mmHg.

Figure 3:
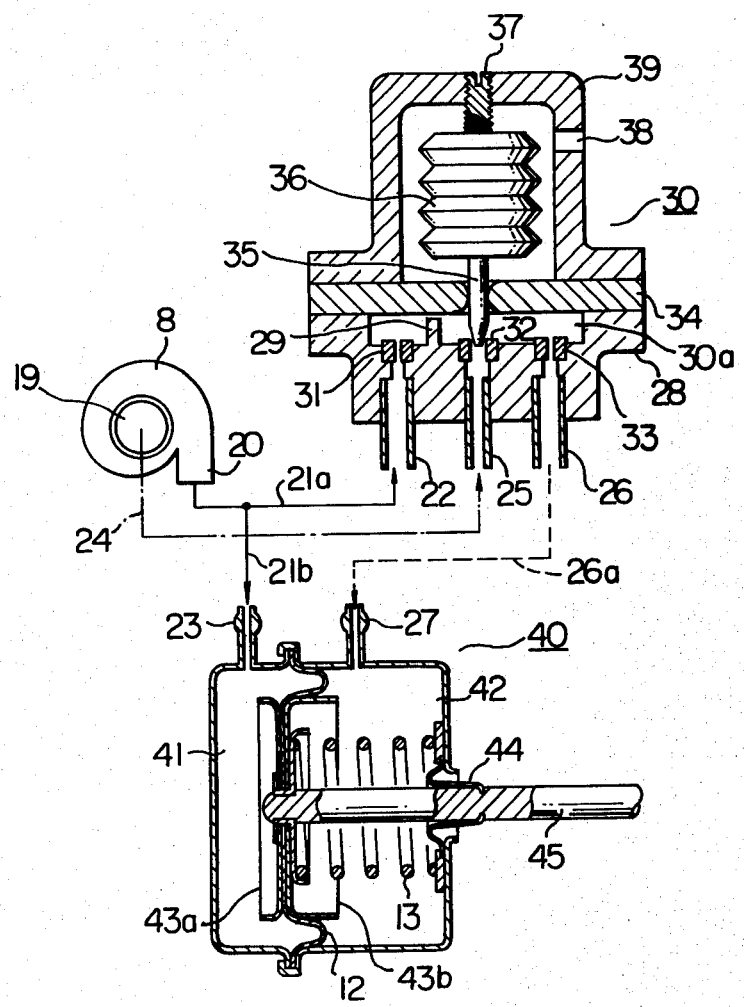
FIG. 3 is a partly sectional and partly diagrammatic view of the turbocharger control system showing the structural details of pressure modulator and valve actuator thereof.

The controlling pressure $P_{c3}$ which is produced by the controlling pressure generating means or pressure modulator 30 will be discussed with reference to FIG. 3. The pressure $P_{c1}$ derived from a point 19 upstream of the compressor 8 is introduced through a conduit 24 into a port 25 of the pressure modulator 30. The supercharging pressure $P_{c2}$ derived from a point 20 downstream of the compressor 8 is introduced into another port 22 of the pressure modulator 30 through a pressure passage 21a. The pressure passage 21a has a branch passage 21b connected to a port 23 of the actuator 40 so that the supercharging pressure $P_{c2}$ is also introduced into the port 23 of the actuator. The pressure modulator 30 has a third port 26 which is pneumatically connected to a second port 27 of the actuator 40 by a passage 26a.

The ports 22, 25 and 26 of the pressure modulator 30 are provided on a generally cup-shaped housing member 28 which cooperates with a sealing plate 34 to define a controlling pressure producing chamber or pressure modulating chamber 30a. The ports 22, 25 and 26 are respectively communicated with the chamber 30a through orifices 31, 32 and 33. The housing member 28 has a partition 29 disposed between the orifices 31 and 32 and extending into the chamber 30a towards the sealing plate 34. A generally U-shaped second housing member 39 is secured to the surface of the sealing plate 34 remote from the housing member 28 and cooperates with the sealing plate 34 to accommodate a bellows member 36 filled with air at 1 atm measured at substantially sea level. The bellows member 36 has an end face rigidly connected with a needle 35 which slidably and sealingly extends through a central opening in the sealing plate 34 and has a tapered free end extending into the orifice 32 to cooperate therewith to continuously vary the area of opening of the orifice 32 to the chamber 30a. The other end face of the bellows member 36 is rigidly connected to an adjusting screw 37 which is threadably engaged with an internally threaded opening formed in the housing member 39. The outer surfaces of the bellows member 36 are subjected to the atmospheric pressure through a vent hole 38 formed in the housing member 39. The bellows member 36 is provided for the purpose of altitude compensation to be described in more detail hereinbelow.

The actuator 40 is provided with a supercharging pressure chamber 41 and a controlling pressure or modulated pressure chamber 42. These chambers 41 and 42 are partitioned by the diaphragm 12 and communicated with the ports 23 and 27, respectively, so that the supercharging pressure $P_{c2}$ is introduced through the port 23 into the chamber 41 while the controlling pressure $P_{c3}$ is introduced through the port 27 into the other chamber 42. The chamber 42 houses therein the spring 13 and is sealed against the atmospheric pressure by a sleeve-like rubber sealing member 44 provided between the end wall of the chamber 42 and the rod 45. The diaphragm 12 is sandwiched between washers 43a and 43b to which the rod 45 is secured at its end. The diaphragm 12 is displaced or deformed against the spring 13 when the difference in pressure between $P_{c2}$ and $P_{c3}$ exceeds 300 mmHg.

Assuming that the pressure modulator 30 is not provided with the altitude compensation means constituted by the bellows member 36 and the needle 35 and that a motor vehicle equipped with the system described above is operated at an altitude of about 1,000 meters above sea level, a pressure $P_{c'1}$ at the point 19 above the compressor 8 is lower than the pressure $P_{c1}$ by about 90 mmHg, as will be clearly seen from the comparison between the curves $P_{c'1}$ and $P_{c1}$ shown in FIG. 2. A supercharging pressure $P_{c'2}$ is also lower than the supercharging pressure $P_{c2}$. Accordingly, a controlling pressure $P_{c'3}$, which is obtained by mixing the pressures $P_{c'1}$ and $P_{c'2}$, is also lower than the pressure $P_{c3}$. Because the actuator 40 starts its operation to open the bypass valve 3 when the pressure difference across the diaphragm 12 exceeds 300 mmHg, the bypass valve 3 is opened to release the engine exhaust gases when the supercharging pressure rises to about 310 mmHg, as shown by curve $P_{c'2}$ in FIG. 2. Thereafter, the supercharging pressure $P_{c'2}$ is kept substantially constant. At the altitude of about 1,000 meters, therefore, the bypass valve 3 is opened at the supercharging pressure $P_{c'2}$ which is 90 mmHg lower than the supercharging pressure $P_{c2}$ obtained at substantially sea level.

The altitude compensation means constituted by the bellows member 36 and the needle 35 is operative to assure that, even if the motor vehicle is operated at a high altitude, the controlling pressure to be introduced into the chamber 42 of the actuator 40 is always adjusted to be of a level shown by the solid line curve $P_{c3}$ in FIG. 2 and thus the supercharging pressure is also controlled to be of a level shown by the solid line curve $P_{c2}$ in FIG. 2.

When the motor vehicle equipped with the system described above is operated at a high altitude, the bellows member 36 of the pressure modulator 30 is expanded to cause the needle 35 to decrease the area of opening of the orifice 32. The compressor 8 produces a charging pressure which is introduced into the pressure modulating chamber 30a of the pressure modulator 30 through the orifice 31, although the supercharging pressure produced at this time is lower than the supercharging pressure obtained at substantially sea level but is higher than the atmospheric pressure at the high altitude. The air pressure derived from the point 19 upstream of the compressor 8 is also introduced into the pressure modulating chamber 30a through the orifice 32. However, because the opening of the orifice 32 is restricted at this time by the needle 35, the rate of the pressure introduction through the orifice 32 into the chamber 30a is smaller than the rate obtained at the sea level. Accordingly, the controlling pressure produced in the modulating chamber 30a and introduced into the chamber 42 of the actuator 40 through the port 27 is a relatively high pressure which is higher than the atmospheric pressure at the high altitude and is close to the supercharging pressure at the point 20 downstream of the compressor 8.

On the other hand, the supercharging pressure derived from the compressor 8 is introduced into the supercharging pressure chamber 41 of the actuator 40 directly, i.e., without being modulated, to urge the diaphragm 12 against the action of the spring 13 to thereby move the rod 45 outwardly of the actuator 40. The rod 45, therefore, rotates the lever 45a in clock-wise direction as viewed in FIG. 1 to open the bypass valve 3.

The turbocharger control system is operative to introduce into the actuator 40 a supercharging pressure derived from the compressor 8 and a controlling pressure which is derived from the pressure modulator 30 and is so modulated as to be close to the atmospheric pressure at the sea level. The actuator 40 is operative to compare the two pressures to actuate the exhaust gas bypass valve 3. Thus, the turbocharger control system described above is free from the prior art problem that the exhaust gas bypass valve is opened at an early time, i.e., at a supercharging pressure lower than a predetermined level, to reduce the amount of engine exhaust gases to be fed to the turbine 7. When the motor vehicle is operated at a low altitude, the atmospheric pressure is increased to contract the bellows member 36 so that the turbocharger control system automatically resumes its initial or normal operation at the low altitude.

The controlling pressure to be introduced into the controlling pressure chamber 42 of the actuator 40 can be adjusted by adjusting the adjusting screw 37 of the pressure modulator 30. Thus, the time at which the exhaust gas bypass valve 3 starts its opening movement can be appropriately adjusted.

It will be apparent from the foregoing description that the controlling pressure introduced into the controlling pressure chamber 42 of the actuator 40 is modulated to be of a level which is between the pressures at the points 19 and 20 upstream and downstream of the compressor 8, respectively. This feature of the invention advantageously reduces the influence of the atmospheric pressure on the opening timing of the bypass valve 3 as compared with the case where the pressure at the point 19 upstream of the compressor is directly introduced into the controlling pressure chamber 42.

If the orifices 31, 32 and 33 were not provided in the pressure modulator 3, the controlling pressure chamber 42 of the actuator 40 would be supplied with a pressure which is exactly intermediate between the pressures $P_{c1}$ and $P_{c2}$ derived from the points 19 and 20 upstream and downstream of the compressor 8, respectively. For example, when the engine is operated at 2,500 rpm, the chamber 42 is supplied with a pressure of 380 mmHg which is intermediate between pressure $P_{c1}$ of about $-20$ mmHg and pressure $P_{c2}$ of about 400 mmHg. On the other hand, the other chamber 41 of the actuator 40 is supplied with supercharging pressure of about 400 mmHg. Thus, the actuator 40 is required to operate in response to the pressure differential of as small as about 20 mmHg with a result that the actuator fails to provide a stable operation. The turbocharger control system described above, however, is in fact provided with the orifices 31, 32 and 33 which cooperate together to modulate the pressures $P_{c1}$ and $P_{c2}$ into the controlling pressure $P_{c3}$ as shown in FIG. 2 to thereby assure that the actuator 40 can be subjected to a pressure differential of as high as 300 mmHg and thus provide a stable operation.

As shown in FIG. 4, an electric pressure modulator generally designated by the reference numeral 50 controls the pressure, with the pressure $P_{c1}$, derived from the point 19 upstream of the compressor 8 being introduced through the conduit 24 into a port 55 of the electric pressure modulator 50, while the supercharging pressure $P_{c2}$ derived from the point 20 downstream of the compressor 8, is introduced through the conduit 21a into a port 52 of the pressure modulator 50 and is also introduced through a branch line 21b into the port 23 of the supercharging pressure chamber 41 of the actuator 40. The port 27 of the controlling pressure chamber 42 of the actuator 40 is pneumatically connected to a port 56 of the pressure modulator 50 by means of a conduit 56a.

The ports 52, 55 and 56 are respectively communicated through orifices 61, 62 and 63 with a pressure modulating chamber 50a defined between a sealing plate 64 and a generally cup-shaped housing member 58 on which the ports 52, 55 and 56 are provided. The housing member 58 is provided with a partition 59 disposed between the orifices 61 and 62 and extending into the chamber 50a toward the sealing plate 64. A valve member 65 is disposed in the pressure modulating chamber 50a for movement toward and away from the orifice 61. The sealing plate 64 is formed therein with an opening through which a rod 71 of a solenoid 70 extends slidably and sealingly into the pressure modulating chamber 50a with the rod 71 having an end extremity rigidly secured to the valve member 65 so that the same is movable with the rod 71.

The rod 71 is connected to a plunger 73 of the solenoid 70. The plunger 73 is biased upwardly by a spring 74 so that the valve member 65 is moved away from the orifice 61. The solenoid 70 has a coil 75 electrically connected between an electric power source 76 and a transistor 77 having a base terminal to which is applied a pulsated current of a high frequency as high as about 100 cycles per second. The coil 75, when electrically energized, is operative to downwardly bias the plunger 73 against the spring 74 to cause the valve member 65 to close the orifice 61. The duration within which the plunger 73 of the solenoid 70 is based downwardly is determined in proportion to a ratio represented by "$T_{on}/T$", hereinafter referred to as "on duty", "$T_{on}$" is the time period during which a pulsated current flows within each cycle T, as diagrammatically shown in FIG. 5. The pulsated current is supplied to the transistor 77 by an electric circuit formed by a pressure sensor 80, operative to detect the atmospheric pressure level, a controlling circuit 79, responsive to the thus detected atmospheric pressure level to determine the "on duty", and an amplifier 78 through which the pulsated current with the "on duty" thus determined is fed to the base terminal of the transistor 77. The plunger 73 is guided for an axial movement by a linear bearing means 72 surrounding the plunger 73.

In operation, when a motor vehicle equipped with the electric pressure modulator 50 is operated at a high altitude, the controlling circuit 79 is operative to shorten $T_{on}$ to cause the valve member 65 to open the orifice 61 for a longer period in each cycle T than at sea level. A quantity of air which is larger than that obtained at the sea level is introduced through the restricted orifice 61 into the pressure modulating chamber 50a, while a pressure derived from the point 19 upstream of the compressor 8 is introduced into the chamber 50a through the orifice 62. Thus, the controlling pressure produced in the pressure modulating chamber 50a and introduced therefrom through the ports 56 and 27 into the controlling pressure chamber 42 of the actuator 40 is at a relatively high pressure level which is higher than the atmospheric pressure at the high altitude and is close to the supercharging pressure at the point 20 downstream of the compressor 8. On the other hand, the supercharging pressure chamber 41 of the actuator 40 is supplied with the supercharging pressure directly derived from the compressor 8 and urges the diaphragm 12 against the spring 13 to move the rod 45 outwardly of the actuator 40 so that the exhaust gas bypass valve 3, which is operatively connected to the rod 45 as discussed previously, is opened. In other words, the actuator 40 of the embodiment of FIG. 4 is operative to open the exhaust gas bypass valve 3 based on the comparison between the supercharging pressure derived from the compressor 8 and the controlling pressure which is so modulated as to be close to the atmospheric pressure at the low altitude. Thus, the turbocharger control system of the second embodiment is also free from the prior art problem that the exhaust gas bypass valve is opened so early that the turbine 7 is supplied with an insufficient amount of engine exhaust gases.

In the embodiment of FIG. 4, the solenoid-operated valve member 65 is utilized to control the introduction into the pressure modulating chamber 50a of the supercharging pressure derived from the point 20 downstream of the compressor 8. The valve member 65, however, may alternatively be utilized to control the introduction into the chamber 50a of the pressure derived from the point 19 upstream of the compressor 8.

What is claimed is:

1. A control system for a turbocharger mounted on an internal combustion engine having intake and exhaust manifolds, said turbocharger including a turbine driven by engine exhaust gases from said exhaust manifold and a compressor mechanically connected to said turbine for producing compressed air to be introduced into said intake manifold, said control system including an exhaust gas bypass duct extending between exhaust gas ducts provided upstream and downstream of said turbine, a waste gate mounted in said bypass duct to control the rate of exhaust gas flow through said bypass duct and controlling means mechanically connected to said waste gate to actuate said waste gate, characterized by:

generating means pneumatically connected to air ducts upstream and downstream of said compressor for producing a controlling pressure of a level between a first pressure proportional to the air pressure upstream of said compressor and a second pressure proportional to the air pressure downstream of said compressor;

said generating means including an altitude compensation means for adjusting said controlling pressure as a function of the atmospheric pressure to which said engine is subjected; and said controlling means being operative to actuate said waste gate in response to the pressure difference between said controlling pressure produced by said generating means and said air pressure downstream of said compressor.

2. A turbocharger control system as claimed in claim 1, wherein said altitude compensation means is operative in response to the atmospheric pressure to control the introduction of at least one of said first and second pressures into said generating means.

3. A turbocharger control system as claimed in claim 1, wherein said altitude compensation means is operative in response to the atmospheric pressure to control the introduction of said first pressure into said generating means.

4. A turbocharger control system as claimed in claim 3, wherein said generating means further includes a chamber communicated with said air ducts upstream and downstream of said compressor through pressure regulating orifices, and wherein said altitude compensation means includes a valve member movable in response to variation of the atmospheric pressure to vary the rate of restriction of the orifice pneumatically connected to said air duct upstream of said compressor.

5. A turbocharger control system as claimed in claim 4, wherein said altitude compensation means further includes a bellows member connected to said valve member and filled with a reference pressure, said bellows member being surrounded by the atmospheric pressure.

6. A turbocharger control system as claimed in claim 1, wherein said altitude compensation means is operative in response to the atmospheric pressure to control the introduction of said second pressure into said generating means.

7. A turbocharger control system as claimed in claim 6, wherein said generating means further includes a chamber communicated with said air ducts upstream and downstream of said compressor through pressure regulating orifices, and wherein said altitude compensation means includes a valve member operative in response to variation of the atmospheric pressure to vary the rate of introduction of said second pressure into said chamber through the orifice pneumatically connected to said air duct downstream of said compressor.

8. A turbocharger control system as claimed in claim 7, wherein said altitude compensation means further includes means for actuating said valve member, means for detecting the atmospheric pressure and means operatively associated with said detecting means to emit a signal to said actuating means as a function of the atmospheric pressure thus detected by said detecting means.

* * * * *